United States Patent
Sun et al.

(10) Patent No.: US 11,663,337 B2
(45) Date of Patent: May 30, 2023

(54) METHODS AND SYSTEMS FOR SYSTEM CALL REDUCTION

(71) Applicant: GEORGE MASON UNIVERSITY, Fairfax, VA (US)

(72) Inventors: Kun Sun, Fairfax, VA (US); Lingguang Lei, Beijing (CN)

(73) Assignee: GEORGE MASON UNIVERSITY, Fairfax, VA (US)

( * ) Notice: Subject to any disclaimer, the term of this patent is extended or adjusted under 35 U.S.C. 154(b) by 726 days.

(21) Appl. No.: 16/518,529

(22) Filed: Jul. 22, 2019

(65) Prior Publication Data
US 2020/0026859 A1    Jan. 23, 2020

Related U.S. Application Data
(60) Provisional application No. 62/701,262, filed on Jul. 20, 2018.

(51) Int. Cl.
*G06F 21/57* (2013.01)
*G06F 9/445* (2018.01)

(52) U.S. Cl.
CPC ........ *G06F 21/575* (2013.01); *G06F 9/44505* (2013.01); *G06F 2221/034* (2013.01)

(58) Field of Classification Search
CPC .............. G06F 21/575; G06F 9/44505; G06F 2221/034; G06F 11/3466; G06F 8/36; G06F 21/6281
See application file for complete search history.

(56) References Cited

U.S. PATENT DOCUMENTS
2018/0217996 A1 * 8/2018 Joshi .................... G06F 16/1774
2018/0218148 A1 * 8/2018 D'Errico ............... G06F 16/245

FOREIGN PATENT DOCUMENTS
| | | | | |
|---|---|---|---|---|
| EP | 1526427 A2 * | 4/2005 | ............. | A01K 87/00 |
| EP | 2113859 A1 * | 11/2009 | ......... | G06F 12/1483 |
| WO | WO-0003320 A1 * | 1/2000 | ........... | G06F 3/0619 |

OTHER PUBLICATIONS
Goldberg, et al., A Secure Environment for Untrusted Helper Applications Confining the Wily Hacker; Sixth UNSENIX UNIX Security Symposium, San Jose, CA, Jul. 1996 (14 pages).
Maggi, et al., Detecting Intrusions through System Call Sequence and Argument Analysis; IEEE Transactions on Dependable and Secure Computing, Vol, 7, No. 4, Oct.-Dec. 2010 (15 pages).
Provos, Neils, Improving Host Security with System Call Policies, Proceedings of the 12th USENIX Security Symposium, Washington, DC, Aug. 4-8, 2003 (16 pages).
Zeng, et al., Tailored Application-specific System Call Tables (2013) (12 pages).

* cited by examiner

*Primary Examiner* — Mohammad W Reza
(74) *Attorney, Agent, or Firm* — Ballard Spahr LLP

(57) ABSTRACT

Disclosed are methods and systems for system call reduction. An application container may be used to encapsulate an application and to determine an operation state of the application. Based on the application state, the application container may determine one or more allowable system calls for the application. The application container may restrict access to one or more system calls excluded from the one or more allowable system calls.

20 Claims, 8 Drawing Sheets

METHODS AND SYSTEMS FOR SYSTEM CALL REDUCTION

CROSS-REFERENCE TO RELATED PATENT APPLICATION

This application claims priority to U.S. Provisional Application No. 62/701,262, which was filed on Jul. 20, 2018, and is herein incorporated by reference in its entirety.

STATEMENT REGARDING FEDERALLY SPONSORED RESEARCH

This invention was made with government support under grant numbers N00014-16-1-3216 and N00014-16-1-3214 awarded by the Office of Naval Research. The government has certain rights in the invention.

BACKGROUND

Malware can compromise a user's system and perform malicious operations. To prevent these operations, application containers and/or container management tools can restrict system calls available to an application. This limits the number of possible attack vectors available to the malware. However, typical approaches to system call reduction provide a superset of system calls for all applications. This broad approach can lead to system calls being left available for malicious operations.

The wide adoption of containers as an application deployment platform may also attract attackers' attention. Since the system calls are the entry points for processes trapping into a system's kernel, system call filters have been integrated into popular container management tools to effectively constrain the system calls available to the container. However, these popular container management tools lack a method to obtain and customize a set of necessary system calls for a given application. These and other considerations are addressed by the approaches set forth herein.

SUMMARY

It is to be understood that both the following general description and the following detailed description are exemplary and explanatory only and are not restrictive. Provided are methods and systems for system call reduction. An application container can determine an operation state of an application. Operation states can include, for example, boot-up, execution, and/or shut down. Based on the operation state, the application state can determine one or more system calls allowable for use by the application. The allowable one or more system calls can be determined based on previously monitoring an execution of the application and identifying which system calls are being performed during the respective operation states. The allowable one or more system calls can be determined by parsing the source code of the application to determine which system calls are required to perform the encoded operations. An indication of the one or more allowable one or more system calls can be stored for access by the application container on execution of the application. The application container can then restrict one or more system calls excluded from the allowable one or more system calls.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
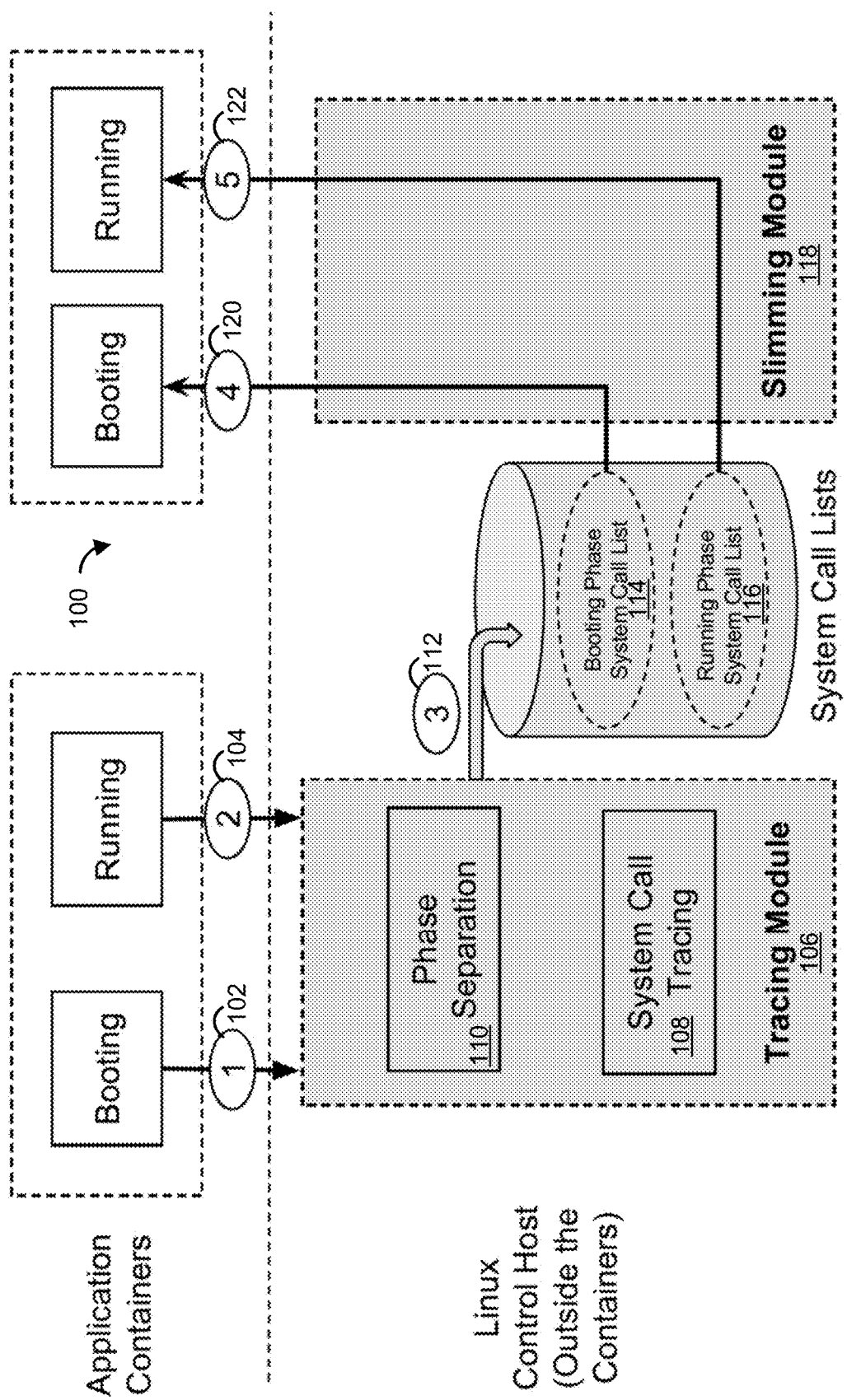
FIG. 1 shows a flowchart of an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Note that in various instances this detailed disclosure may refer to a given entity performing some action. It should be understood that this language may in some cases mean that a system (e.g., a computer) owned and/or controlled by the given entity is actually performing the action.

The term "namespace," as used herein refers to a core system mechanism that allows isolation of an application's view of system resources within a container. For example, a Linux kernel may use six types of namespaces: pid, user, uts, mnt, net, and ipc. Pid namespace isolate a process ID number space, which means each container may have a process whose PID is 1 and processes in different the pid namespace may have a same PID value. All processes inside a container may have a mapping PID on a Linux Kernel host outside the container. For instance, a process with PID 1 in one container could be a process on the host with PID 1001.

Secure computing (referred to herein as "seccomp") is a sandboxing tool in the Linux kernel that may be used to restrict a process from making certain system calls. Since system calls provide entry points for processes in one container into a host kernel, a malicious application and/or code may misuse system calls to disable security measures and escape out of the container. Seccomp can be used to reduce the number of entry points into the kernel space, thereby reducing the kernel attack surface (e.g., attack vector surface). Seccomp has three working modes: seccomp-disabled, seccomp-strict, and seccomp-filter. The seccomp-filter mode allows a process to specify a filter for incoming system calls. The Linux kernel provides two system calls, prctl( ) and seccomp( ), that may be used to set the seccomp filter mode. However, these two system calls may only be used to change the seccomp filter mode of the calling thread/process and may not be able to set the seccomp filter mode for other processes.

The present disclosure relates to system call reduction for malware prevention. Existing approaches for preventing malicious operations by malware target system calls used by the malware. A system call is a programmatic way in which a computer program (e.g., the malware or a legitimate application process) requests a service from a kernel of an operating system. Examples of such services include memory access, creation, and execution of new processes; and communication with integral kernel services, such as project scheduling. One approach to malware prevention is using a machine learning model (e.g., a supervised machine learning model or an unsupervised machine learning model) to identify system calls being made and determine if the identified system calls match models for malicious activity. The downside to this approach is it relies on the accuracy of the training and/or modeling of the machine learning model, it is computationally intensive, and it requires frequent updates as new patterns of malicious system call activity are identified.

Another approach is to encapsulate an application within an application container and to use an application container manager to restrict the system calls available to the contained applications. An application container is an encapsulated instance of the application, including all required dependencies (e.g., operating system dependencies, libraries, etc.), thereby allowing for the creation of multiple virtualized user spaces for a given application. The application container manager typically restricts the available system calls to a super set of system calls available to any encapsulated application. The downside to this approach is it leaves open many system calls to a given application that are unnecessary, creating a larger than necessary number of attack vectors (e.g., system calls) for malware to exploit.

As is set forth in further detail below, an application container can determine an operation state of an application. Operation states can include, for example, boot-up, execution, and/or shut down. Based on the operation state, the application state can determine one or more system calls allowable for use by the application. The allowable one or more system calls can be determined based on previously monitoring an execution of the application and identifying which system calls are being performed during the respective operation states. The allowable one or more system calls can be determined by parsing the source code of the application to determine which system calls are required to perform the encoded operations. An indication of the one or more allowable system calls can be stored for access by the application container on execution of the application. The application container can then restrict one or more system calls excluded from the allowable one or more system calls. By defining which system calls are allowable on a per-application basis, it ensures that only the system calls necessary for a given application are allowed, thereby providing for a smaller attack vector (e.g., a smaller set of system calls available to malware) when compared to approaches that allow for a broader set of system calls for all applications. The attack vector can be further restricted by allowing only those system calls required for the operation state in which the application state is operating.

An application container usually requires different sets of available system calls at different phases during the lifetime of its execution. Since most application containers are used to run long-term services, such as web servers and database servers, the lifetime of those containers can be generally divided into two phases—namely, a booting phase and a running/execution phase. The booting phase is responsible for setting the container environment and initializing a service. In the long-term running/execution phase, the container service begins to accept service requests and send back responses. Due to the different sets of functions demanded in these two phases, a number of system calls invoked in the booting phase may no longer be needed and thus can be removed in the running phase. For example, out of a given number of available system calls throughout the entire lifetime of a container, less than half of the given number of system calls may be invoked in the booting phase, and an even smaller number of system calls may be needed in the running phase of a corresponding data server.

The present methods and systems implement a split-phase container execution mechanism that can reduce the number of necessary system calls during the lifetime of an application container's execution. For a given application container, the present methods and systems first profile the two sets of system calls required for the booting phase and the running phase, respectively. Based on the profiling results, the present methods and systems can constrain the available system calls accordingly. Both system call profiling and constraint setting run outside the container. Thus, implementing the present methods and systems may not require any changes to an image of the container.

To profile the system calls required in either booting phase or running phase, a time point to separate the two phases may first be determined. For example, a polling-based method to identify an accurate phase splitting time point for a given container image may be used. As another example, a coarse-grained phase separation approach, which can find a generic separation time point for application containers running on a specific platform, may be implemented. After obtaining the phase splitting time point, dynamic program analysis may be performed to record the system calls invoked during the container booting and running phases.

The set of available system calls in the booting phase may be statically configured, and the available system calls may be dramatically changed when the container switches from the booting phase into the running phase. For example, in a Linux-based based kernel, the available system call list can be represented as a seccomp filter of one process, which may be set by two system calls, such as prctl( ) and seccomp( ). However, the two system calls may only be called to install the seccomp filters onto the calling process, and it may therefore be required to change the seccomp filters of the processes inside the container from another process outside the container. Otherwise, a malicious process with root privileges inside the container may be able to disable the constraints on the system calls. Since all processes inside one container may share a same seccomp filter, the seccomp filter of one process may be changed to update the available system calls for the entire container. To modify a container's seccomp filter from the outside, the semantic gap may need to be filled to find and change data structures of seccomp filters.

Some popular uses for containers and container management tools include deployment of web applications, such as web server containers (e.g., nginx, Tomcat, httpd, php, etc.) and data store containers (e.g., MySQL, Redis, MongoDB, and Postgres). The present method and systems may reduce more than 35% of system calls in the running phase for data store containers and more than 50% of system calls in the running phase for web server containers. The number of system calls for web server containers may vary when deploying different web applications; however, they may share most system calls, since a primary function of all web servers is largely the same (e.g., processing HTTP requests and web pages).

FIG. 1 shows an example system 100 in which the present methods and systems may operate. The system 100 may include a Tracing Module 106 and a Slimming Module 118. For a given application container, the tracing module 106 may be responsible for profiling available system calls in a booting phase at 102 and a running phase at 104. The tracing module 106 may share the system call lists with the slimming module 118, which may be responsible for constraining the available system calls when the container boots up at 120 and runs at 122.

Both modules may run outside of application containers as root-privileged processes in a host operating system. The tracing module 106 may be used to generate system call sets for the booting phase and the running phase, respectively. The tracing module 106 may be transparent to applications inside the container and consist of two components: a phase separation component 110 and a system call tracing component 108. The phase separation component 110 may be in charge of separating the execution of the application containers into two phases—namely, the booting phase and the running phase. Though the booting phase may be short, it may require a number of extra system calls 114 to set up the execution environments, and those system calls may no longer be necessary in the running phase. Moreover, the running phase may require some extra system calls 116 to support the service's functions. Thus, a running point that separates these two phases may be determined in order to profile their system calls. For example, in the booting phase of an Apache web server, the container and the web server may be booted and all modules needed for the service execution, such as mod php and mod perl, may be loaded. In the running phase, the Apache web server may accept and handle the requests and generate the responses.

A polling-based method may be used by the system 100 to achieve a reliable phase separation, which may find a splitting time point by continuously checking status changes of the running service. Once the booting up finishes at 102, the service enters the running status at 104. For example, most current Linux distributions provide a service utility to uniformly manage various services, such as Apache, mySQL, nginx, etc. The polling-based method may determine the split-phase time point by checking the service status through running the service command with a status option. The polling-based method may work best when the service creates its own /etc/init.d script.

Figure 2:
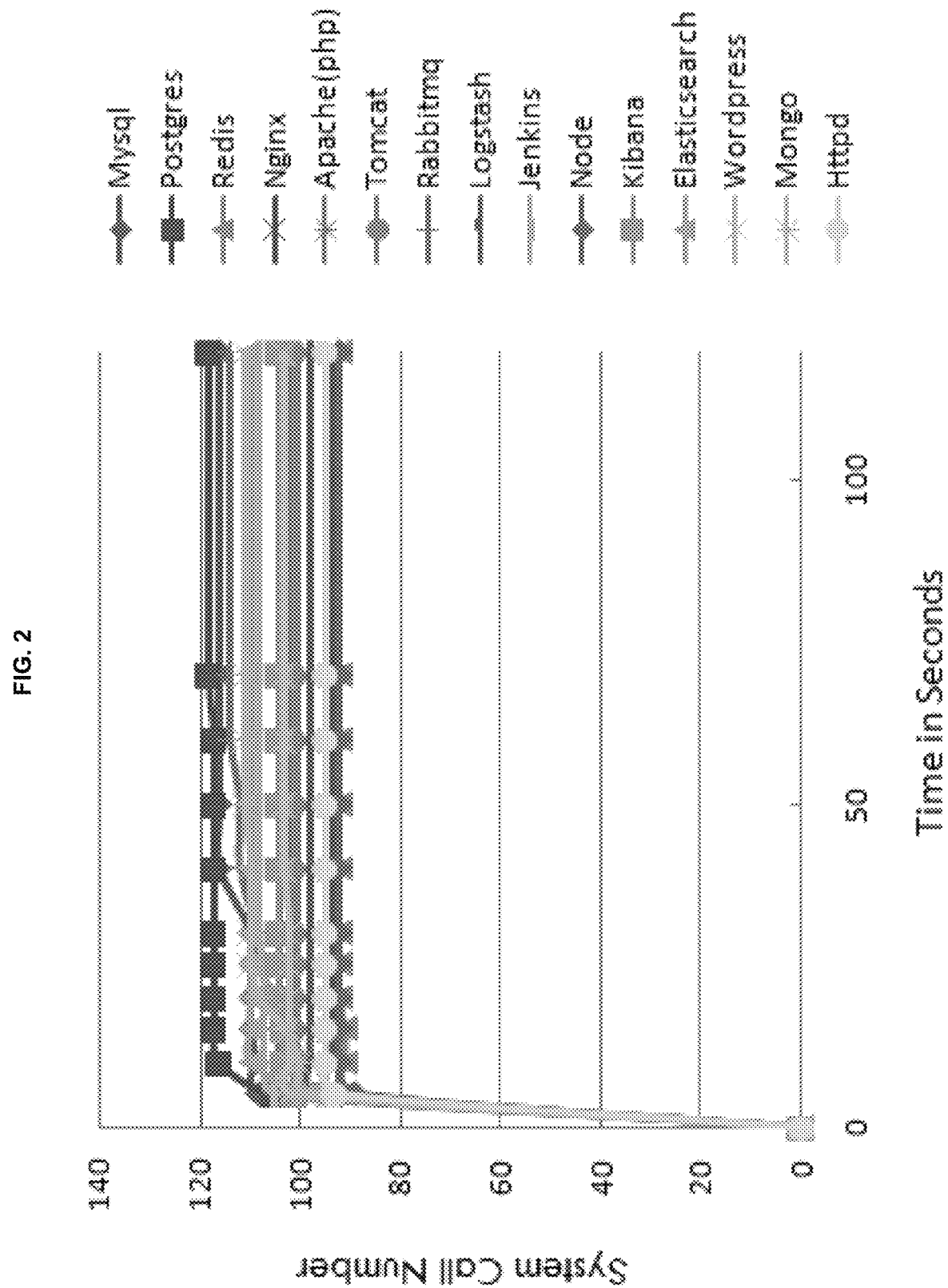
FIG. 2 shows an example graph.

A coarse-grained phase separation approach, which is generic and service independent, may also be used by the system 100. The coarse-grained phase separation approach may be based on two observations. First, the container and service booting can finish quickly in tens of seconds. Second, a number of invoked system calls may keep increasing during the booting phase and become stable after the booting process ends when the container enters an idle running state. FIG. 2 shows a graph indicating that a number of system calls may increase quickly in the first 10 seconds after the container starts to boot, and the number of system calls may begin to become stable after 70 seconds when the containers enter the idle running state. A rough time point (e.g., 100 seconds) may be determined for all containers. This time point may be different for other services on different hardware platforms; however it may not be larger than a couple of minutes.

Figure 3:
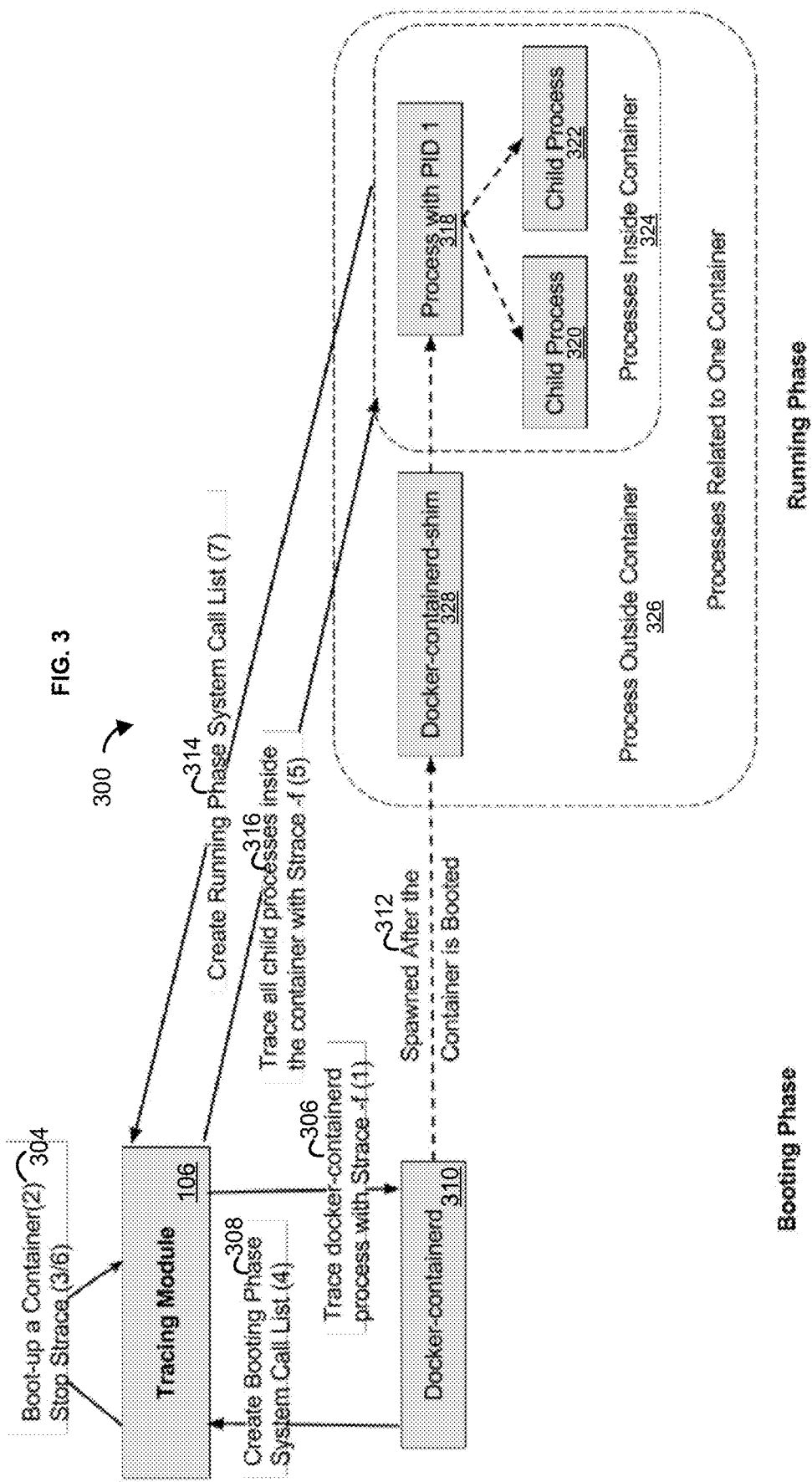
FIG. 3 shows an example workflow.

FIG. 3 shows an example workflow 300 that may implemented by the tracing module 106. The system call tracing component 108 of the tracing module 106 may be responsible for tracing the execution of the container as well as the hosted application to obtain the necessary system calls used in each phase. In most cases, multiple processes may be running inside a container, as shown at 324, even if only one service is hosted. Therefore, the system call tracing component 108 may need to ensure that all the processes inside the container at 324 are correctly identified to adequately collect the invoked system calls. System call tracing may be performed by using a static analyzer to extract all the system calls used from a container image or by using a dynamic analyzer to collect the system calls invoked during the container booting and running stages. For example, the Linux Strace tool may be used to dynamically trace the necessary system calls for a given application container. Process mapping between the container and a host operating system may be used to trace container processes outside 326 the container.

As shown in FIG. 3, the tracing process may consist of seven steps, where the first four steps may target at creating a booting phase system call list (e.g., steps 306, 312, 304, and 308) and the remaining steps may generate a running phase system call list. To guarantee completeness of the tracing results, the -f option of Strace may be enabled at 316 to trace the children of the processes currently being traced. Since a container is a group of processes sharing a same set of kernel resources, the processes inside the container 324 may be normal processes with different attributes, such as pid, uid, and gid, when viewed from the host operating system. For example, each container may include a process with PID 1 318, but the same process may have a PID larger than 1000 on the host operating system. Therefore, instead of running Strace to trace the processes inside one container, the same process on the host operating system may be traced using a different PID.

Steps 312 and 306 demonstrate the parent-child relationship among the container processes from the host operating system's point of view. Each container may include a docker-containerd-shim process 328, which may be the parent of all the remaining container processes (e.g., processes 318, 320, 322). The docker-containerd-shim processes 328 may be spawned from the process docker-containerd 310 at step 312. Therefore, the booting phase system call list may be obtained at step 308 through tracing the process docker-containerd 310 at step 306. Similarly, the running phase system call list may be obtained at step 314 through tracing all processes inside the container at step 316 when the booting is finished (e.g., the child processes 320, 322 of the container's docker-containerd-shim process 316).

Returning to FIG. 1, the slimming module 118 may be responsible for monitoring the execution of the container and dynamically changing the available system call list for all processes inside one container during different execution phases. The slimming module 118 may restrict the container to use only system calls in the booting phase system call list during the booting phase. During the running phase, the slimming module 118 may only allow system calls in the running phase system call list, and the slimming module 118 may add new system calls and remove old system calls in the booting phase system call list. A single process inside the container may be insufficient to implement the slimming module 118, since a malicious process with root privileges in the container may be able to manipulate a single-process slimming module to disable the constraints on the system calls. To avoid such a scenario, the slimming module 118 may be implemented outside of the target container.

The slimming module 118 may be implemented as a user space program on the host operating system with root privileges. The slimming module 118 may be based on the seccomp mechanism in the Linux kernel. A seccomp filter records an available system call list. In Linux, it is possible for a process to be attached with multiple seccomp filters, and all seccomp filters may be organized in a one-way linked list. Each seccomp filter may be implemented as a program code composed of seccomp instructions, which may be represented as a bpf prog structure. Each seccomp filter structure may have a prog pointer pointed to the bpf prog structure. Each instruction may be a 4-tuple structure that includes actual filter code, a jump offset when the filter codes returns true, a jump offset when false is returned, and a generic value.

Figure 4:
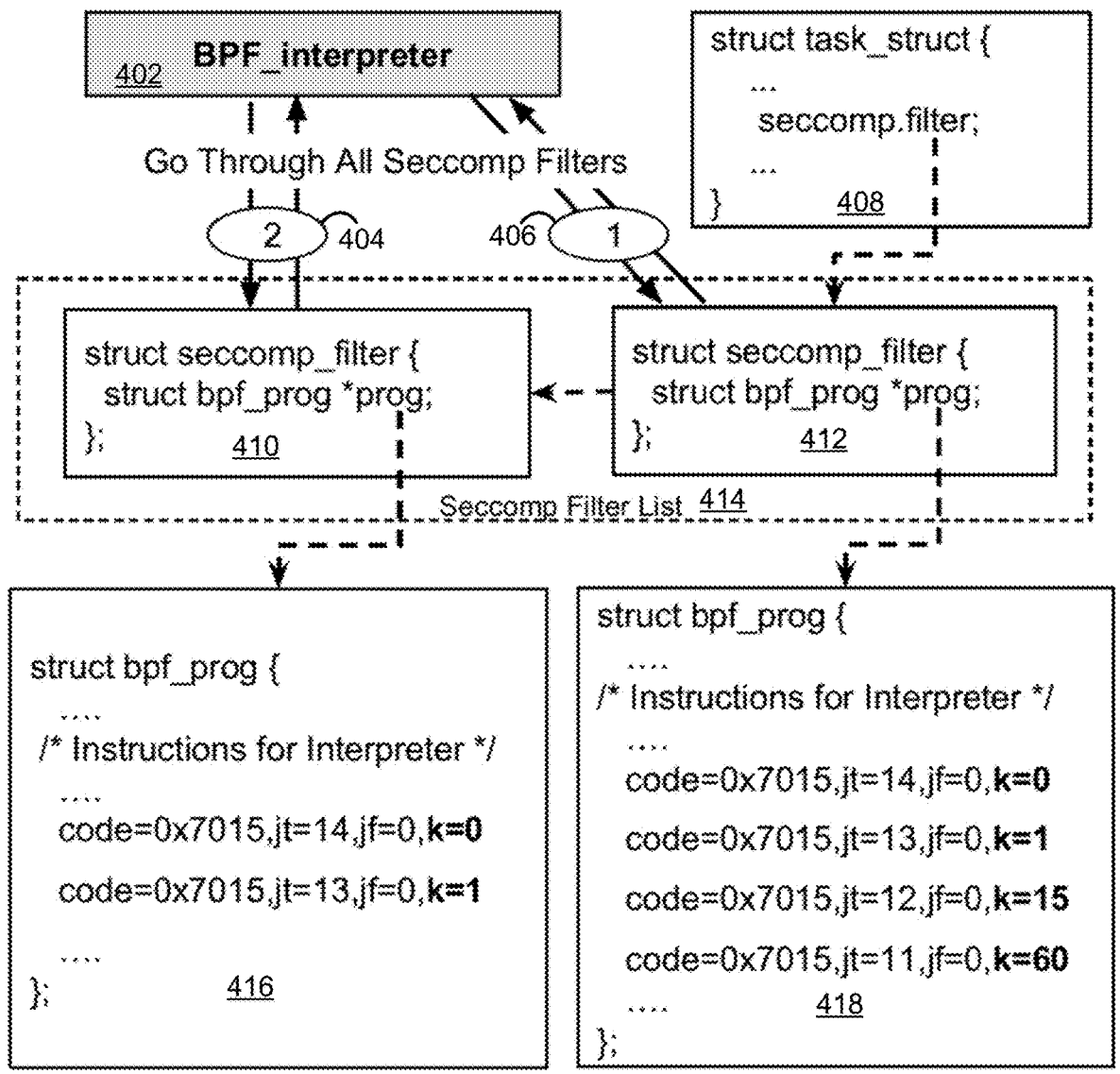
FIG. 4 shows an example workflow.

FIG. 4 shows an example of a process 400 attached with two seccomp filters 410 and 412 in a seccomp filter list 414. The filter 412 may restrict the process 400 to use the system calls read( ), write( ), rt sigreturn( ) and exit( ), as shown in bpf prog structure 418. K-values in the bpf prog structure 418 may correspond to the system call numbers of these four system calls. The seccomp filter 410 may restrict the process 400 to use only read( ) and write( ) system calls, as shown in bpf prog structure 416.

Seccomp Filters in the Linux Kernel's seccomp mechanism may restrict the set of system calls available to a process. The list of available system calls may be represented as a seccomp filter data structure 408. Each process may have a task struct structure that contains a seccomp structure, which may define the seccomp state of the process 400. If the process 400 is being protected by seccomp, the filter field of the seccomp structure may point to the first seccomp filter defined as a seccomp filter structure.

A BPF interpreter 402 running in the Linux Kernel may be in charge of enforcing the system call filtering. When the process 400 invokes a given system call, the BPF interpreter 402 may go through all the seccomp filters attached to this process at steps 404 and 406. As long as one seccomp filter does not include the given system call, the process 400 may not be allowed to invoke the given system call. When a rt sigreturn( ) system call is invoked by the process 400, the BPF interpreter 402 may first check the seccomp filter 418 and determine that the rt sigreturn( ) system call is allowed. However, when the BPF interpreter 402 continues to check the seccomp filter 416, the BPF interpreter 402 may determine that the rt sigreturn( ) system call is not allowed. After combining these two results, the BPF interpreter 402 may deny the rt sigreturn( ) system call.

The Linux kernel provides two system calls, prctl( ) and seccomp( ), to change seccomp filters of one process. However, these two system calls may not directly be used to dynamically change the seccomp filters of one container. First, these two system calls may only install seccomp filters onto the calling process. Second, after one seccomp filter is installed, it may not be removed or changed when the process is running. In other words, these two system calls may be used to add new seccomp filters but they may not be able to remove any existing filters. Some system calls used in the running phase are not necessary for the booting phase, and vice-versa. Therefore, the memory address of the seccomp filters may be located and their contents may be directly modified in memory.

Figure 5:
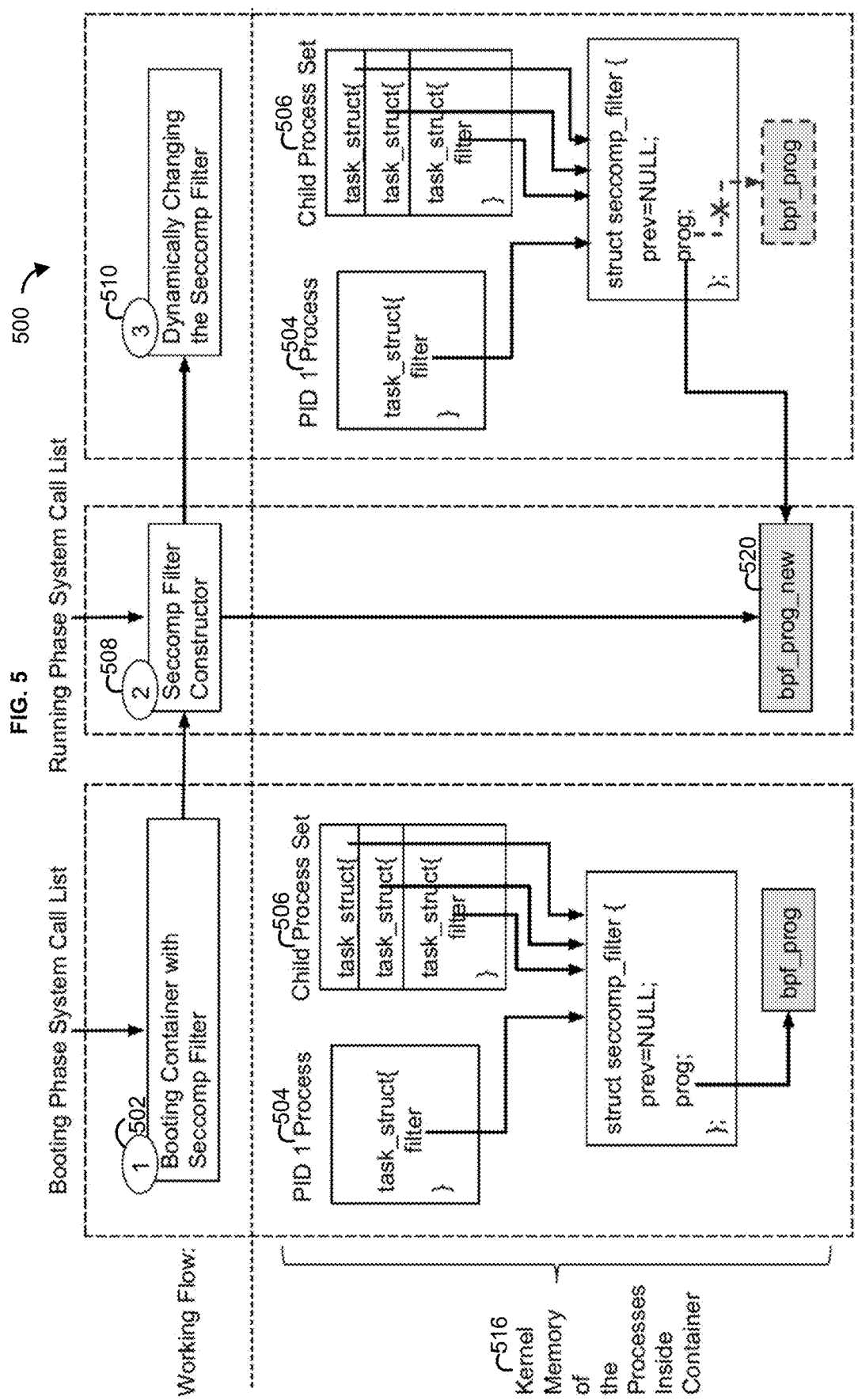
FIG. 5 shows an example workflow.

FIG. 5 shows an example workflow 500 of the slimming module 118. The slimming module 118 may construct a new bpf prog struct in memory 516 based on the available system call list and then redirect the prog pointer to the new bpf prog struct. The workflow 500 may include three steps. At step 502, a container may be booted with system calls in the booting phase system call list. At step 508, a Seccomp Filter Constructor may be used to generate a bpf prog struct 520 that may record seccomp instructions according to the running phase system call list. At step 510, the seccomp filters of all the processes 504, 506 inside the container may be changed to the newly crafted bpf prog struct 520.

Returning to FIG. 3, as shown in the workflow 300, before a container is created, the docker-containerd-shim process 328 may be spawned at 312. The docker-containerd-shim process 328 may be the parent process of all the remaining processes inside the container. The seccomp filter for the booting phase may be enabled to protect the booting phase once the docker-containerd-shim process 328 has been created. Alternatively, the booting phase system call list may be transformed into a seccomp profile and utilize a -security-opt seccomp optional function to launch the container by the command, for example, "docker run-id-security-opt seccomp:booting-phase-system-call-profile.json image name". This approach may be less secure than the first one, since the seccomp filter may not be enabled immediately after the container starts to boot.

Figure 6:
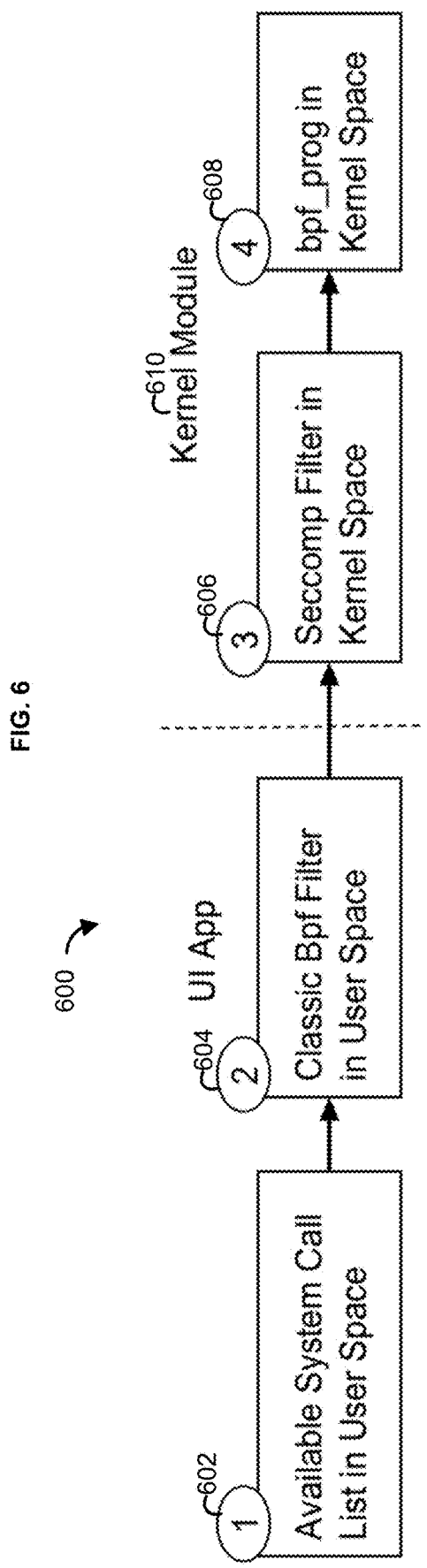
FIG. 6 shows a flowchart of an example workflow.

The seccomp filter constructor used at step 508 of FIG. 5 may be used, as shown at step 602 of workflow 600 of FIG. 6, to generate a kernel data structure of the seccomp filter for a given system call list. The constructor may be composed of a user-level process, such as UIApp, and a Linux kernel module to perform a three-step transformation. At step 604, the user-level process may take the system call list as an input and generate a corresponding bpf filter program. The libseccomp Linux library may be used to convert one available system call list to bpf filter instructions. For example, the seccomp rule add( ) method from the libseccomp library may be used to add all available system calls, and the seccomp export bpf( ) method may be used to export the resulting bpf filter program. At step 606, the bpf filter program generated in the user space may be passed into a kernel module 610, which may convert the program into a seccomp filter. Since some code of the bpf filter program may be specific to the seccomp filter. For example, the code may be slightly different from those in classic bpf filters. Finally, at step 608, a bpf prog structure is generated (e.g., the bpf prog new structure 520). In the Linux kernel, a bpf program with a new instruction set that may be totally different from the ones in the seccomp filter program that may be accepted by the BPF interpreter 402, which may be included in a bpf prog structure.

In some scenarios, an internal kernel function bpf prog create, from method user( ) may be used to implement steps 606 and 608. The internal kernel function may accept two parameters, such as a pointer to the user space filter program and a function pointer to an internal kernel function seccomp check filter( ). The user space filter buffer may be copied into a kernel buffer, and then a passed-in seccomp check filter( ) function may be called to transform the classic bpf filter program into a seccomp bpf filter program. The bpf prog struct, including a bpf program with a new instruction set, may also be generated.

The internal kernel function may be an internal, non-exported kernel function. In addition, when the kernel module is installed with a system function call in UIApp (e.g., insmod kernel-module), the installed kernel module may not be running in the same address space as the UIApp. Therefore, the user space filter buffer pointer created in step 602 may not be able to be directly passed into the internal kernel function. Data content of the user space bpf filter may be directly passed into the kernel module as a kernel module parameter, and a copy may be created in the kernel. The internal kernel function may then be changed slightly to enable it to accept the kernel buffer filter data and to incorporate it into the kernel module. In addition, the function seccomp check filter( ) may not be exportable as well. As a result, all related code may be extracted, and the function seccomp check filter( ) may be implemented as a kernel module.

Using the new bpf prog new structure 520, seccomp filters of all container processes may be dynamically changed to enforce available system calls in a running phase. When a container is successfully booted, more than one process may be running inside the container. For example, 6 processes may be created after an Apache service is launched in the container. As a result, the seccomp filter may need to change for all processes. The inheritance attribute of the seccomp filter indicates that a forked child process will inherit the seccomp filter of its parent. As shown in FIG. 5, when the service and the container are booted through command docker run-id-security-opt seccomp, the first process 504 in the container may have only one seccomp filter, and the first process's 504 child processes 506 may inherit this seccomp filter and contain the same pointer pointing to the bpf prog structure. When the bpf prog structure of one process is changed in the container, the seccomp filters of all processes may be changed. As further shown in FIG. 5, initially all the processes 504, 506 possess the same bpf prog struct in the booting phase. After changing the system call list, all the processes 504, 506 may share the bpf prog new structure 520, which may record the running phase system call list. Therefore, the kernel module 610 shown in FIG. 6 may first locate the task struct of the first process 504 inside the container through its PID, which is the process with PID 1 318 shown in FIG. 3. The kernel module 610 may then determine the pointer of bpf prog through the task struct, as shown in FIG. 5 at steps 508 and 510, and then modify the pointer to point to the newly constructed bpf prog new structure 520.

Figure 7:
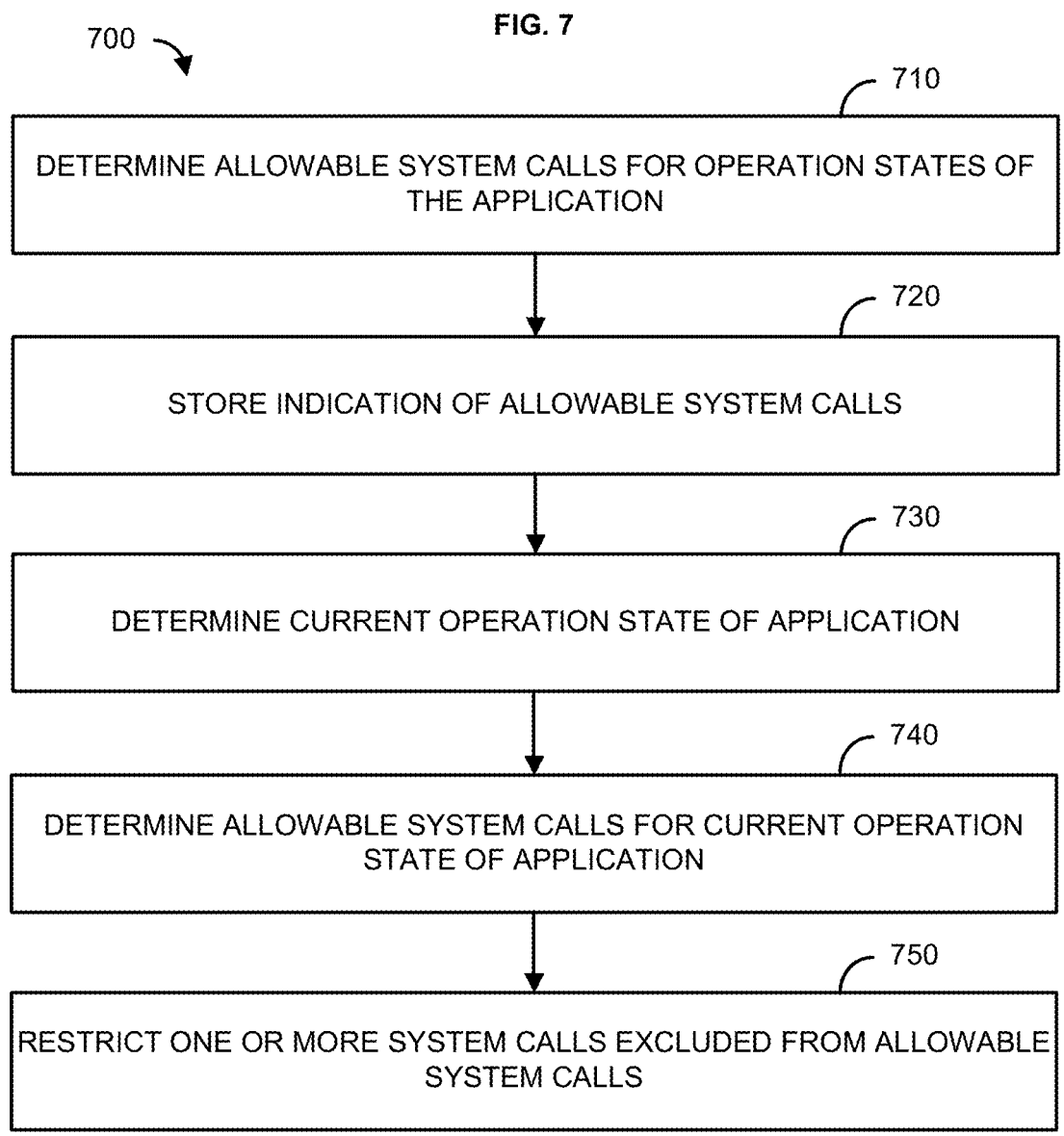
FIG. 7 shows a flowchart of an example method.

FIG. 7 shows a flowchart of an example method 700. Method 700 may be implemented using the system 100 of FIG. 1 and/or the workflows 300, 400, 500, 600 shown in FIGS. 3-6. Beginning with step 710, one or more allowable system calls may be determined for an application. The one or more allowable system calls may comprise the one or more system calls required by an application to perform in a given operation state. Operation states for an application state can include boot-up (e.g., initial start-up of an application), execution (e.g., performing operations after initial boot-up), and shut-down (e.g., ending execution, freeing allocated memory). Thus, determining the one or more allowable system calls can comprise determining, for one or more operation states of an application, a respective one or more allowable system calls.

Determining the one or more allowable system calls can comprise monitoring an execution of the application to determine, as the one or more allowable system calls, one or more system calls performed by the application. A respective one or more system calls can be identified for each operation state of the application during execution. For example, a first one or more system calls can be identified for a boot-up operation state of the application, a second one or more system calls can be identified during execution of the application, and a third one or more system calls can be identified during a shutdown operation state of the application. The execution of the application can comprise a user-driven execution of the application, or an automated execution of the application (e.g., executing a test suite of the application).

Determining the one or more allowable system calls can also comprise parsing a source code of the application. For example, the source code of the application can be parsed to identify methods, Application Program Interface (API) calls, functions, and other operations used during the respective operation states of the application. The one or more allowable system calls can then be determined as the system calls used to perform the identified methods, API calls, and functions included in the source code.

At step 720, an indication of the one or more allowable system calls can be stored. For example, an indication of the one or more allowable system calls can be stored in a configuration file or in other data accessible to the application container. The configuration file can be stored in a remote location such that it can be accessible to one or more instances of the application container.

At step 730, a current operation state of the application can be determined (e.g., by the application container). For example, the container can determine that the application is in a boot-up operation state, an execution operation state, or a shutdown application state. At step 740, one or more allowable system calls for the current operation state of the application can be determined. For example, a stored indication of the system calls allowable for the current operation state can be loaded (e.g., from a locally stored configuration file, from a remotely stored configuration file, from memory accessible to the application container). At step 750, one or more system calls excluded from the one or more allowable system calls for the current operation state can be restricted. Thus, only those system calls necessary to perform the functions of the current operation state of the application are allowed, thereby preventing access to these restricted system calls by malicious operations or software.

Figure 8:
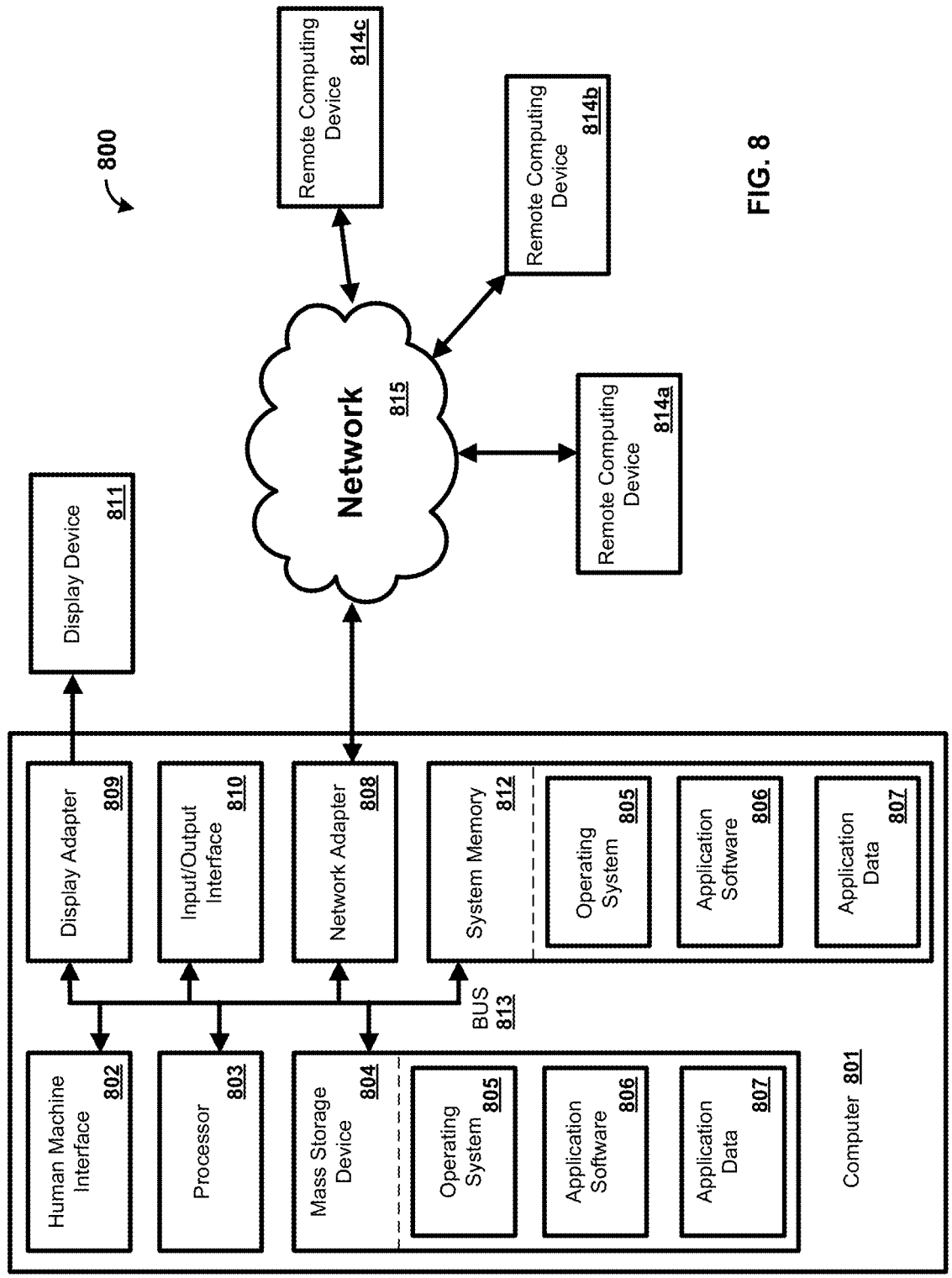
FIG. 8 shows a block diagram of an example computing device.

The present methods and systems may be implemented on a computer 801 as illustrated in FIG. 8 and described below. Similarly, the methods and systems disclosed can utilize one or more computers to perform one or more functions in one or more locations. FIG. 8 is a block diagram illustrating an exemplary operating environment for performing the disclosed methods and systems. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 801. The components of the computer 801 can comprise, but are not limited to, one or more processors 803, a system memory 812, and a system bus 813 that couples various system components including the one or more processors 803 to the system memory 812. The system can utilize parallel computing.

The system bus 813 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 813, and all buses specified in this description can also be implemented over a wired or wireless network connection and each of the subsystems, including the one or more processors 803, a mass storage device 804, an operating system 805, application software 806, application data 807, a network adapter 808, the system memory 812, an Input/Output Interface 810, a display adapter 809, a display device 811, and a human machine interface 802, can be contained within one or more remote computing devices 814*a,b,c* at physically separate locations, connected through buses of this form, in effect implementing a fully distributed system.

The computer 801 typically comprises a variety of computer readable media. Exemplary readable media can be any available media that is accessible by the computer 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as the application data 807 and/or program modules such as the operating system 805 and the application software 806 that are immediately accessible to and/or are presently operated on by the one or more processors 803.

In another aspect, the computer 801 can also comprise other removable/non-removable, volatile/non-volatile computer storage media. By way of example, FIG. 8 illustrates the mass storage device 804 which can provide non-volatile storage of computer code, computer readable instructions, data structures, program modules, and other data for the computer 801. For example and not meant to be limiting, the mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 804, including by way of example, the operating system 805 and the application software 806. Each of the operating system 805 and the application software 806 (or some combination thereof) can comprise elements of the programming and the application software 806. The application data 807 can also be stored on the mass storage device 804. The application data 807 can be stored in any of one or more databases known in the art. Examples of such databases comprise, DB8®, Microsoft® Access, Microsoft® SQL Server, Oracle®, mySQL, PostgreSQL, and the like. The databases can be centralized or distributed across multiple systems.

In another aspect, the user can enter commands and information into the computer 801 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 803 via the human machine interface 802 that is coupled to the system bus 813, but can be connected by other interface and bus structures, such as a parallel port, game port, an IEEE 1394 Port (also known as a Firewire port), a serial port, or a universal serial bus (USB).

In yet another aspect, the display device 811 can also be connected to the system bus 813 via an interface, such as the display adapter 809. It is contemplated that the computer 801 can have more than one display adapter 809 and the computer 801 can have more than one display device 811. For example, the display device 811 can be a monitor, an LCD (Liquid Crystal Display), or a projector. In addition to the display device 811, other output peripheral devices can comprise components such as speakers (not shown) and a printer (not shown) which can be connected to the computer 801 via the Input/Output Interface 810. Any step and/or result of the methods can be output in any form to an output device. Such output can be any form of visual representation, including, but not limited to, textual, graphical, animation, audio, tactile, and the like. The display device 811 and computer 801 can be part of one device, or separate devices.

The computer 801 can operate in a networked environment using logical connections to one or more remote computing devices 814a,b,c. By way of example, a remote computing device can be a personal computer, portable computer, smartphone, a server, a router, a network computer, a peer device or other common network node, and so on. Logical connections between the computer 801 and a remote computing device 814a,b,c can be made via a network 815, such as a local area network (LAN) and/or a general wide area network (WAN). Such network connections can be through the network adapter 808. The network adapter 808 can be implemented in both wired and wireless environments. Such networking environments are conventional and commonplace in dwellings, offices, enterprise-wide computer networks, intranets, and the Internet.

For purposes of illustration, application programs and other executable program components such as the operating system 805 are illustrated herein as discrete blocks, although it is recognized that such programs and components reside at various times in different storage components of the computing device 801, and are executed by the one or more processors 803 of the computer. An implementation of the application software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   determining, by an application container encapsulating an application, a current operation state of the application, wherein the current operation state is associated with an execution phase of the application;
   determining, by the application container, based on at least one filter associated with the current operation state, one or more allowable system calls for the current operation state indicated by the at least one filter; and
   restricting, by the application container, based on the at least one filter, one or more other system calls associated with a different operation state of the application, wherein the one or more other system calls for the different operation state are distinct from the one or more allowable system calls for the current operation state, and wherein the different operation state is associated with a boot-up phase of the application.

2. The method of claim 1, wherein the at least one filter comprises a plurality of system calls required for the current operation state.

3. The method of claim 2, wherein the plurality of system calls is associated with one or more previous executions of the application.

4. The method of claim 2, further comprising:
   identifying, based on a source code of the application, the plurality of system calls, wherein the plurality of system calls comprises the one or more allowable system calls for the current operation state; and
   generating, based on the plurality of system calls, the at least one filter.

5. The method of claim 1, wherein the current operation state is one of a plurality of operation states that are each associated with at least one allowable system call for the corresponding operation state.

6. The method of claim 1, wherein the current operation state comprises a first operation state, wherein the one or more allowable system calls for the current operation state comprise a first one or more allowable system calls for the application, and wherein the method further comprises:
   determining, by the application container, a second operation state of the application;
   determining, by the application container, based on the second operation state of the application, a second one or more allowable system calls for the second operation state; and
   restricting, by the application container, one or more system calls distinct from the second one or more allowable system calls.

7. The method of claim 1, wherein the booting phase is associated with initialization of at least one service of the application, and wherein the execution phase is associated with execution of the at least one service.

8. An apparatus comprising:
   at least one processor, and
   memory storing processor-executable instructions that, when executed by the at least one processor, cause the apparatus to:
   determine, by an application container encapsulating an application, an operation state of the application, wherein the current operation state is associated with an execution phase of the application;
   determine, by the application container, based on at least one filter associated with the current operation state, one or more allowable system calls for the current operation state indicated by the at least one filter; and
   restrict, by the application container, based on the at least one filter, one or more other system calls associated with a different operation state of the application, wherein the one or more other system calls for the different operation state are distinct from the one or more allowable system calls for the current operation state, and wherein the different operation state is associated with a boot-up phase of the application.

9. The apparatus of claim 8, wherein the at least one filter comprises a plurality of system calls required for the current operation state.

10. The apparatus of claim 9, wherein the plurality of system calls is associated with one or more previous executions of the application.

11. The apparatus of claim 9, wherein the processor-executable instructions further cause the apparatus to:
    identify, based on a source code of the application, the plurality of system calls, wherein the plurality of system calls comprises the one or more allowable system calls for the current operation state; and
    generate, based on the plurality of system calls, the at least one filter.

12. The apparatus of claim 8, wherein the current operation state is one of a plurality of operation states that are each associated with at least one allowable system call for the corresponding operation state.

13. The apparatus of claim 8, wherein the current operation state comprises a first operation state, wherein the one or more allowable system calls for the current operation state comprise a first one or more allowable system calls for the application, and wherein the processor-executable instructions further cause the apparatus to:
    determine, by the application container, a second operation state of the application;
    determine, by the application container, based on the second operation state of the application, a second one or more allowable system calls for the second operation state; and
    restrict, by the application container, one or more system calls distinct from the second one or more allowable system calls.

14. The apparatus of claim 8, wherein the booting phase is associated with initialization of at least one service of the application, and wherein the execution phase is associated with execution of the at least one service.

15. A non-transitory computer-readable medium storing processor-executable instructions that, when executed by one or more computing devices, cause the one or more computing devices to:
- determine, by an application container encapsulating an application, an operation state of the application, wherein the current operation state is associated with an execution phase of the application;
- determine, by the application container, based on at least one filter associated with the current operation state, one or more allowable system calls for the current operation state indicated by the at least one filter; and
- restrict, by the application container, based on the at least one filter, one or more other system calls associated with a different operation state of the application, wherein the one or more other system calls for the different operation state are distinct from the one or more allowable system calls for the current operation state, and wherein the different operation state is associated with a boot-up phase of the application.

16. The non-transitory computer-readable medium of claim 15, wherein the at least one filter comprises a plurality of system calls required for the current operation state.

17. The non-transitory computer-readable medium of claim 16, wherein the plurality of system calls is associated with one or more previous executions of the application.

18. The non-transitory computer-readable medium of claim 16, wherein the processor-executable instructions further cause the one or more computing devices to:
- identify, based on a source code of the application, the plurality of system calls, wherein the plurality of system calls comprises the one or more allowable system calls for the current operation state; and
- generate, based on the plurality of system calls, the at least one filter.

19. The non-transitory computer-readable medium of claim 15, wherein the current operation state comprises a first operation state, wherein the one or more allowable system calls for the current operation state comprise a first one or more allowable system calls for the application, and wherein the processor-executable instructions further cause the one or more computing devices to:
- determine, by the application container, a second operation state of the application;
- determine, by the application container, based on the second operation state of the application, a second one or more allowable system calls for the second operation state; and
- restrict, by the application container, one or more system calls distinct from the second one or more allowable system calls.

20. The non-transitory computer-readable medium of claim 15, wherein the booting phase is associated with initialization of at least one service of the application, and wherein the execution phase is associated with execution of the at least one service.

* * * * *